US008273415B2

(12) United States Patent
Porter et al.

(10) Patent No.: US 8,273,415 B2
(45) Date of Patent: Sep. 25, 2012

(54) METHOD OF FORMING A REINFORCEMENT SHEET TO REINFORCE A CEMENTITIOUS BOARD

(75) Inventors: John Frederick Porter, St. Catharines (CA); Timothy Nathaniel Theut, Sterlington, LA (US); Missy Raye Miller, Tuscumbia, AL (US)

(73) Assignee: Saint-Gobain ADFORS Canada, Ltd., Grand Island, NY (US)

( * ) Notice: Subject to any disclaimer, the term of this patent is extended or adjusted under 35 U.S.C. 154(b) by 0 days.

(21) Appl. No.: 12/775,671

(22) Filed: May 7, 2010

(65) Prior Publication Data

US 2010/0310850 A1 Dec. 9, 2010

Related U.S. Application Data

(60) Provisional application No. 61/183,707, filed on Jun. 3, 2009.

(51) Int. Cl.
*B05D 7/24* (2006.01)
(52) U.S. Cl. ..................... 427/403; 427/407.3
(58) Field of Classification Search .................. 427/403, 427/407.3
See application file for complete search history.

(56) References Cited

U.S. PATENT DOCUMENTS

| | | | |
|---|---|---|---|
| 2,943,955 A * | 7/1960 | Brill .............................. | 427/337 |
| 4,378,405 A | 3/1983 | Pilgrim | |
| 5,393,335 A | 2/1995 | Puckett et al. | |
| 6,054,205 A | 4/2000 | Newman et al. | |
| 6,187,409 B1 | 2/2001 | Mathieu | |
| 6,391,131 B1 | 5/2002 | Newman et al. | |
| 6,488,792 B2 | 12/2002 | Mathieu | |
| 6,524,679 B2 | 2/2003 | Hauber et al. | |
| 7,049,251 B2 | 5/2006 | Porter | |
| 7,235,288 B2 * | 6/2007 | Kajander et al. ........... | 428/294.7 |
| 7,241,487 B2 | 7/2007 | Taylor et al. | |
| 7,300,515 B2 | 11/2007 | Porter | |
| 7,300,892 B2 | 11/2007 | Porter | |
| 7,354,876 B2 * | 4/2008 | Porter et al. ................... | 442/172 |
| 7,429,544 B2 | 9/2008 | Grove et al. | |
| 7,521,587 B2 | 4/2009 | Busam et al. | |
| 2002/0182953 A1 | 12/2002 | Porter | |
| 2002/0182954 A1 | 12/2002 | Porter | |
| 2004/0084127 A1* | 5/2004 | Porter ............................ | 156/42 |
| 2004/0214489 A1 | 10/2004 | Porter | |
| 2007/0144077 A1 | 6/2007 | Quranta et al. | |
| 2007/0298235 A1 | 12/2007 | Yoshida et al. | |

OTHER PUBLICATIONS

International Search Report and Written Opinion dated Jan. 26, 2011 in PCT/US2010//034474.

* cited by examiner

*Primary Examiner* — William Phillip Fletcher, III
(74) *Attorney, Agent, or Firm* — Abel Law Group, LLP; Christopher Cianciolo

(57) ABSTRACT

A method of making a reinforcement sheet for a cementitious board includes applying a hydrophilic coating material on binder coated glass fibers, the hydrophilic coating material being mobile in slurry water at a surface of a slurry of a cementitious compound to dilute and disperse, and to wet and spread the slurry on the binder coated glass fibers, and the hydrophilic coating material in the slurry water being volatile to dissipate by evaporation at an elevated temperature at which the cementitious compound is dried for the binder coated glass fibers to be essentially free of the hydrophilic coating material.

7 Claims, 2 Drawing Sheets

METHOD OF FORMING A REINFORCEMENT SHEET TO REINFORCE A CEMENTITIOUS BOARD

CROSS-REFERENCE TO RELATED APPLICATION

This application claims the benefit of U.S. Provisional Patent Application Ser. No. 61/183,707, filed on Jun. 3, 2009.

FIELD OF THE INVENTION

The invention relates to a reinforcement sheet to reinforce a cementitious board, and a cementitious board having the reinforcement sheet. The cementitious board is a structural panel for covering a wall or a ceiling of a building.

BACKGROUND

US 2004/0084127 A1 discloses a glass reinforced cementitious board reinforced by a glass reinforcement sheet, and a hydrophilic coating material on the binder coated glass fibers.

U.S. Pat. No. 7,429,544 discloses a facing material having a randomly oriented mesh filament network with a first binder, an aqueous secondary binder resin having a viscosity sufficient to partially penetrate the open mesh filament network, and an aqueous coating wherein the aqueous coating includes a filler, acicular man-made fibers and a binder of fairly low glass transition temperature.

U.S. Pat. No. 6,524,679 discloses a glass reinforced cementitious board having a cementitious core. The core is formed by a hydraulic cementitious compound constituted as a slurry. The slurry is overlaid and underlayed by glass reinforcement sheets for encasing the core. Further, the outwardly facing surfaces of the sheets are overlaid or coated by applying a thin film of additional slurry to cover and avoid exposed glass fibers of the sheets. The glass fiber profiles are coating with a thin film but are visible under the thin film. Heat is applied to hasten slurry hydration and drying to form a hardened cementitious core, while excess slurry water dissipate by evaporations as water vapor through the sheets to dry the core.

U.S. Pat. No. 4,378,405 discloses a glass reinforced cementitious board for which the cementitious core is formed by vibrating the a hydraulic cementitious compound constituting a slurry while the slurry is overlaid and underlayed by glass reinforcement sheets for encasing the slurry. Vibrations impel the slurry through pores of the sheets to form a thin film of cementitious slurry to cover and avoid exposed glass fibers and to provide a smooth cementitious surface on the thin film.

Further, U.S. Pat. No. 4,378,405 discloses it is difficult under ordinary conditions to bond a cementitious slurry adequately to glass fibers of the sheets that serve as substitutes for conventional paper facings for encasing a slurry.

Further, the glass fibers of the sheet bond together by a binder on the glass fibers. A hydrophobic binder resists wetting by the slurry to resists formation of a thin film of slurry over the glass fibers. A hydrophilic binder on the glass fibers is moisture absorptive to collect moisture and promote unwanted mold and bacterial growth.

Water content of the hydraulic cementitious compound resists bonding to hydrophobic glass fibers and a hydrophobic binder on the glass fibers. However a hydroscopic binder or hydrophilic binder, such as one from a group of polar (polar chemical bonding) acrylic binders or polyvinyl alcohol binder on the glass fibers absorbs and retains moisture, wherein the retained moisture would support undesirable mold or bacterial growth on a cementitious board. Further, a hydroscopic or hydrophilic polar binder loses binder tensile strength by becoming soft and limp when wetted by the cementitious slurry Further, the hydraulic cementitious compound can contain additives that increase the slurry viscosity, making it difficult to bond to the binder covered glass fibers. Further, to provide a water-resistant core that resists moisture absorption, the hydraulic cementitious compound can constitute a water-resistant additive, such as wax-asphalt emulsion, siloxane, styrene/acrylate polymer or silicone.

Apparatus suitable to manufacture the glass reinforced cementitious board is described in each of US 2004/0084127; U.S. Pat. Nos. 7,049,251; 6,524,679 and 4,378,405, wherein US 2004/0084127 discloses a fiber reinforcement sheet treated by spraying for example with a substance to enhance wetting and adhesions characteristics thereof, and a conveyor belt supporting a slurry of a cementitious board and the fiber reinforcement sheet. However, residues of the substance in the cementitious board would contribute to undesired hydroscopicity or hydrophobicity of the cementitious board.

U.S. Pat. No. 7,049,251 discloses a top sheet and a bottom sheet with slurry therebetween and exposed in a drying oven which accelerates drying by increasing the rate of evaporation of excess water.

It would be desirable for reinforcement sheets to be hydrophilic at beginning contact with a slurry of a hydraulic cementitious compound to encourage slurry wetting, slurry spreading and forming an adequate bond with the slurry, and thereafter to be hydrophobic while embedded in a core of a cementitious board to discourage moisture absorption and retention.

SUMMARY OF THE INVENTION

A reinforcement sheet for a cementitious board includes, a thin, water vapor porous layer of glass fibers bonded together by a cured binder to provide binder coated glass fibers, and a hydrophilic coating material on the binder coated glass fibers, the hydrophilic coating material being soluble and transferable to slurry water of a cementitious compound, and then being volatile in the slurry water to dissipate by evaporation at an elevated temperature and time duration at which the cementitious compound is dried to form a cementitious board.

A reinforcement sheet for a cementitious board includes, a thin, water vapor porous layer of glass fibers bonded together by a cured binder to provide binder coated glass fibers, and a hydrophilic coating material on the binder coated glass fibers, the hydrophilic coating material being mobile in slurry water to dilute and disperse upon contact by surface molecules of the slurry water at a surface of a slurry of a cementitious compound to wet the binder coated glass fibers and spread the slurry on the binder coated glass fibers, and the hydrophilic coating material being volatile to dissipate by evaporation at an elevated temperature at which the cementitious compound dries to form a dried cementitious board having both the cementitious compound and the binder coated glass fibers essentially free of the hydrophilic coating material.

A method of making a reinforcement sheet for a cementitious board includes, applying a hydrophilic coating material on binder coated glass fibers wherein the glass fibers are coated with a cured binder, the hydrophilic coating material being mobile in slurry water to dilute and disperse upon contact by surface molecules of the slurry water at a surface of a slurry of a cementitious compound to dilute and disperse, and to wet and spread the slurry on the binder coated glass fibers, and the hydrophilic coating material being volatile to dissipate by evaporation at an elevated temperature at which the cementitious compound is dried for the binder coated glass fibers to be essentially free of the hydrophilic coating material.

A cementitious board includes a core of the cementitious board formed by a slurry of a cementitious compound; and each of one or two major surfaces of the cementitious board having a corresponding reinforcement sheet, wherein a hydrophilic coating material on each corresponding reinforcement sheet is mobile in slurry water to dilute and disperse upon contact by surface molecules of the slurry water at a surface of the slurry to wet the binder coated glass fibers and spread the slurry on the binder coated glass fibers, and the hydrophilic coating material in the slurry water being volatile to dissipate by evaporation at an elevated temperature and time duration at which the cementitious compound dries to form a dried core of the cementitious board having both the cementitious compound and the binder coated glass fibers essentially free of the hydrophilic coating material. An embodiment of a cementitious board includes, a reinforcement sheet having a hydrophilic coating material on binder coated glass fibers and a slurry of a cementitious compound, the hydrophilic coating material being mobile to dilute and disperse upon contact by surface molecules of slurry water at a surface of the slurry to wet the binder coated glass fibers and spread the slurry on the binder coated glass fiber, and the hydrophilic coating material being volatile to dissipate by evaporation at an elevated temperature and time duration at which the cementitious compound dries to form a dried cementitious board having both the cementitious compound and the binder coated glass fibers essentially free of the hydrophilic coating material.

A method of making a cementitious board includes, applying a hydrophilic coating material on a reinforcement sheet having binder coated glass fibers and assembling the reinforcement sheet with a slurry of a cementitious compound, the hydrophilic coating material being mobile to dilute and disperse upon contact by surface molecules of slurry water at a surface of the slurry to wet and spread the slurry on the binder coated glass fibers, and drying the cementitious compound at an elevated temperature at which the hydrophilic coating material is volatile and dissipate by evaporations to form a dried cementitious board having both the cementitious compound and the binder coated glass fibers essentially free of the hydrophilic coating material.

BRIEF DESCRIPTION OF THE DRAWINGS

Embodiments of the invention will now be described by way of example with reference to the accompanying drawings.

DETAILED DESCRIPTION

Figure 1:
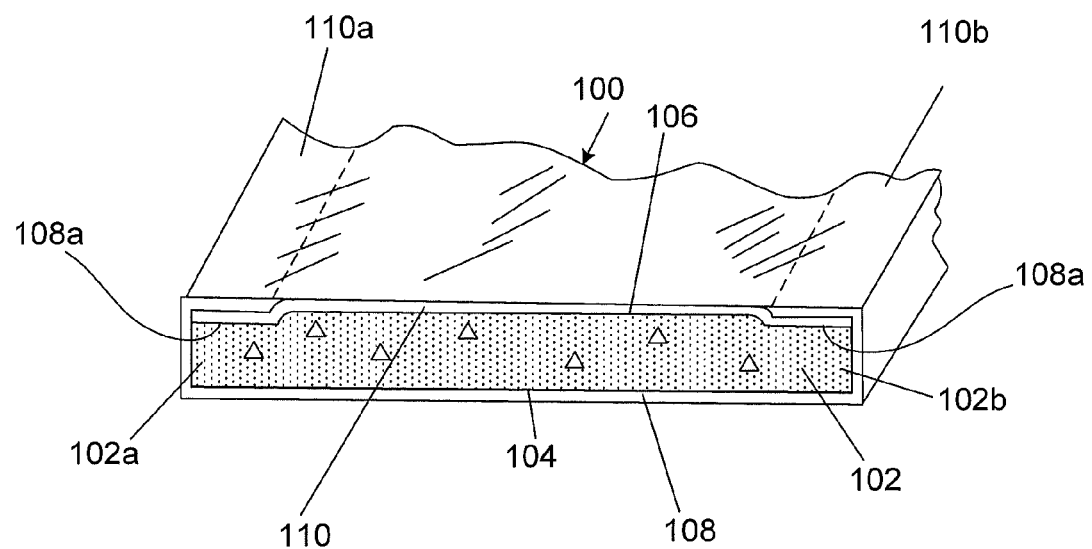
FIG. 1 is a fragmentary isometric view of a portion of a cementitious board embodiment.

FIG. 1 discloses a glass reinforced cementitious board 100 having a cementitious core 102. The core 102 is formed by a slurry of a hydraulic cementitious compound. The slurry forms a layer thickness between a surface on an finished side 104 of the core 102 and surface on an unfinished side 106 of the core 102. The slurry is underlayed by a sheet 108 for reinforcing the core 102. One sheet 108 covers a surface 104 on the finished side of the core 102. The sheet 108 can be the same area size as the surface 104 on the finished side. Alternatively, the sheet 108 can be larger in area size and wraps around the edges 102a, 102b of the core 102. A surface 106 on an unfinished side of the cementitious board 100 can have a paper sheet 110, while the finished side has a glass reinforcement sheet 108. In yet another embodiment each of the sheets 108, 110 is a glass reinforcement sheet. In an embodiment, the sheets 108, 110 overlap along their edge margins 108a, 110a to surround the slurry.

The slurry wets and spreads over the reinforcing sheets 108, 110. The reinforcing sheets 108, 110 and the slurry are supported underneath during manufacture, which forms a smooth surface against a supporting surface of a conveyor belt or forming table. In an embodiment wherein the slurry penetrates through pores of the sheet 108, the slurry forms a thin film of slurry on the exterior of the sheet 108. The thin film is formed with a smooth surface against the supporting surface of a conveyor belt or forming table. The unfinished side surface 106 is unsupported and tends to form a less smooth surface to constitute an unfinished side surface 106 of the cementitious board 100.

Heat is applied to hasten slurry hydration and curing. The slurry hydrates and cures at least partially to form a hardened cementitious core 102, while excess slurry water dissipates by evaporation as water vapor through the sheets 108, 110 to dry the core 102. The water of hydration refers to a portion of the water content in the slurry that reacts chemically with the cementitious compound to form a hydrate of the core 102. The water of convenience refers to another portion of the water content in the hydraulic cementitious compound that is present primarily to render the slurry fluid enough to process. The water of convenience is the water that dissipates by evaporation through the pores of the embodiments of the sheets 108, 110 having a thin porous layer of glass fibers. Each reinforcement sheet 108, 110 reinforces a corresponding surface 104, 106 of the cementitious board to resist tensile and flexural loads that would cause unwanted board fractures.

In some embodiments, the slurry penetrates through the sheets 108, 110 and displaces air residing in pores of the sheets 108, 110. The displaced air transpires through the slurry thin film but tends to disturb the surface of the slurry and create a surface texture roughness. The surface texture roughness includes miniaturized peaks and valleys and capillaries to collect or retain moisture and thereby encourage development of mold and mildew. To minimize these surface deficiencies, it would be desirable for the glass reinforcement sheets 108, 110 to be hydrophilic at beginning contact with the cementitious slurry to encourage wetting by the slurry, which would rapidly displace the air from the sheets 108, 110. Moreover, hydrophilic sheets 108, 110 that are hydrophilic at beginning contact with the slurry would form an adequate bond with the cementitious compound after core hydration and drying.

The invention provides a glass reinforcement sheet 108, 110 to imbed partially in a cementitious board 100 to reside on the surface 104, 106 of the board 100. Alternatively the sheet 108, 110 imbeds fully in a cementitious board 100. The sheet 108, 110 may be imbedded partially or fully in one or both major surfaces 104, 106 of the board 100, and may wrap over edges 102a, 102b of the board 100. Further, the invention provides a cementitious board 100 having the partially embedded or fully embedded glass reinforcement sheet 108, 110. Methods for making the sheet 108, 110 and the cementitious board 100 are disclosed.

Embodiments of the hydraulic cementitious compound include matrices of a hydrating cementitious material including, but not limited to gypsum, Portland cement, mortar, geopolymers and clay minerals. Embodiment of the hydraulic cementitious compound can include a mixture of the cementitious material with structural additives including but not limited to reinforcement fibers and fillers and aggregates of sand or stone and recycled cementitious materials.

Other embodiments of the hydraulic cementitious compound can constitute a mixture with an additive in aqueous solution or emulsion. The effect of an additive on adhesion can be positive (e.g. shrinkage reducing admixture) neutral (e.g. light stabilizer or negative (e.g. siloxanes, waxes). An additive includes, resins such as starch, EVA, PvOH, acrylics, polyvinyl acetate, or the like, setting accelerators, biocide resistant and/or fire resistant additives, such as siloxane, borax, fillers, setting retardants, dispersing agents, dyes and colorants, light stabilizers, heat stabilizers, shrinkage reducing admixtures, air entraining agents, setting accelerators, foaming agents, coloring agents and curing agents.

Further, to improve water-resistant properties of cementitious compounds, an additive includes, metallic resinates; wax or asphalt emulsions or mixtures thereof; a mixture of wax and/or asphalt and also corn-flower and potassium permanganate; water insoluble thermoplastic organic materials such as petroleum and natural asphalt, coal tar, and thermoplastic synthetic resins such as poly(vinyl acetate), polyvinylchloride and a copolymer of vinyl acetate and vinyl chloride and acrylic resins; a mixture of metal rosin soap, a water soluble alkaline earth metal salt, and residual fuel oil; a mixture of petroleum wax in the form of an emulsion and either residual fuel oil, pine tar or coal tar; a mixture comprising residual fuel oil and rosin, aromatic isocyanates and disocyanates; organohydrogenpolysiloxanes and other silicones, acrylics, and a wax-asphalt emulsion with or without such materials as potassium sulfate, alkali and alkaline earth elements. Performance additives can be introduced directly into the slurry.

If gypsum is employed as the primary hydraulic cement, the slurry may be formed by mixing water with powdered anhydrous calcium sulfate or calcium sulfate hemidrate ($Ca-SO_4\frac{1}{2}H_2O$), also known as calcined gypsum, and thereafter allowing the mixture to hydrate or set into calcium sulfate dihydrate ($CaSO_42H_2O$), a relatively hard material. The slurry includes at least about 85 wt. % set gypsum or cement.

The hydraulic cementitious compound can constitute a mixture having a filler additive including, fly ash, slag, ceramics including silicon oxide, titanium oxide, and silicon nitrite and metakaolin and reinforcement fibers including those made from glass, aramids, polyolefins, carbon, graphite, polyester, PVA, polypropylene, natural fibers, cellulosic fibers, rayon, straw, paper and hybrids thereof.

A preferred embodiment of the glass reinforcement sheet 108, 110 includes a thin porous layer of glass fibers 202 coated at least partially with a cured binder 204 to adhere the glass fibers 202 together and provide binder coated glass fibers 202. The pores among the binder coated glass fibers 202 of the thin porous layer 108 or 100 are water vapor porous to pass water vapor evaporating from the slurry. In a preferred embodiment the glass fibers 202 are chopped to provide chopped fibers of desired lengths. The fibers are accumulated to form a layer. Then binder 204 is applied to the fibers and cured to provide binder coated glass fibers 202 in a thin, water vapor porous layer 200 of the glass reinforcement sheet 108, 100. In an alternative embodiment, the glass fibers 202 are assembled by being interlaced, including weaving and braiding, then bonded together by a binder 204, or are non-woven by being laid across one another, then bonded together by a binder 204. Another preferred embodiment of the glass reinforcement sheet 108, 110 includes the thin, water vapor porous layer 200 reinforced with a mesh 300 adhesively attached to overlie a slurry facing side of the thin, water vapor porous layer 200. The mesh 300 has mesh openings large enough for penetration by the slurry.

Some embodiments of the thin, water vapor porous layer 200 provide a fully imbedded thin, water vapor porous layer 200 in a major surface 108, 110 of a reinforced cementitious board 100. In an embodiment of the thin, water vapor porous layer 200, the pores among the binder coated glass fibers 202 are water vapor porous to pass water vapor while a small pore size is impermeable to the entire hydrated cementitious compound to prevent penetration of the slurry. The glass reinforcement sheet 108, 110 is exposed over the core 102 to provide an adherent surface for direct painting or other directly applied wall finishing and covering material. Further, the thin, water vapor porous layer 200 is at least partially exposed to provide an adherent surface for a coating of water repellant material, for example, an acrylic coating on a gypsum board. Other embodiments of the glass reinforcement sheet 108, 110 provide a portion of the thin, water vapor porous layer 200 of the reinforcement sheet 108, 110 to remain exposed on the reinforced cementitious board 100 to provide a bond surface, and onto which an EIPS finish is applied and bonded after installing the reinforcement sheet 108, 110 to provide an exterior wall surface of a building. In another embodiment of the thin, water vapor porous layer 200 the pores among the binder coated glass fibers 202 are water vapor porous to pass water vapor and have a pore size large enough to be porous to slurry particles smaller than at least the largest pore size of the sheet 108, 110. The slurry penetrates the thin, water vapor porous layer 200 and forms a thin film layer of cementitious compound on the binder coated glass fibers 202, with the profiles of the coated glass fibers 202 visible under the thin film.

According to another embodiment of the thin, water vapor porous layer 200, the glass fibers 202 are exposed to receive a coating of an additional slurry of high water content to be applied to the thin porous layer 200, such that the fibers 202 of the thin porous layer 202 become surface coated with a thin film of the slurry of high water content, with the profiles of the coated glass fibers 202 visible under the thin film. Further, the slurry of high water content merges with the slurry forming the core.

Figure 2:
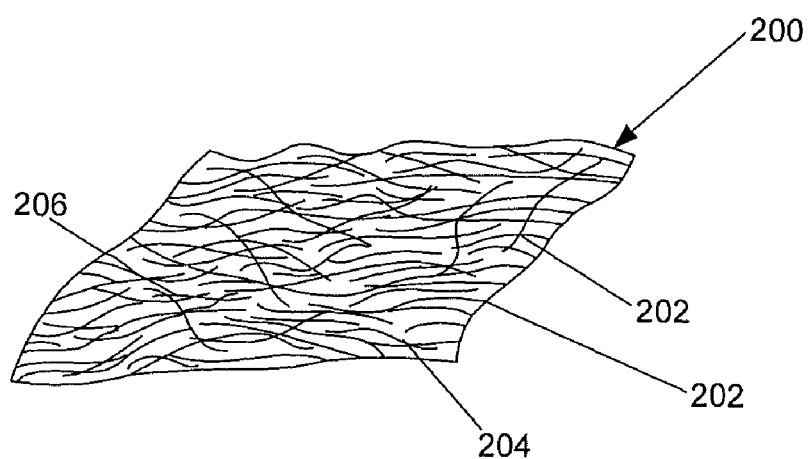
FIG. 2 is a fragmentary isometric view of a reinforcement sheet embodiment having a thin porous layer of binder coated glass fibers having a coating material thereon.
Figure 3:
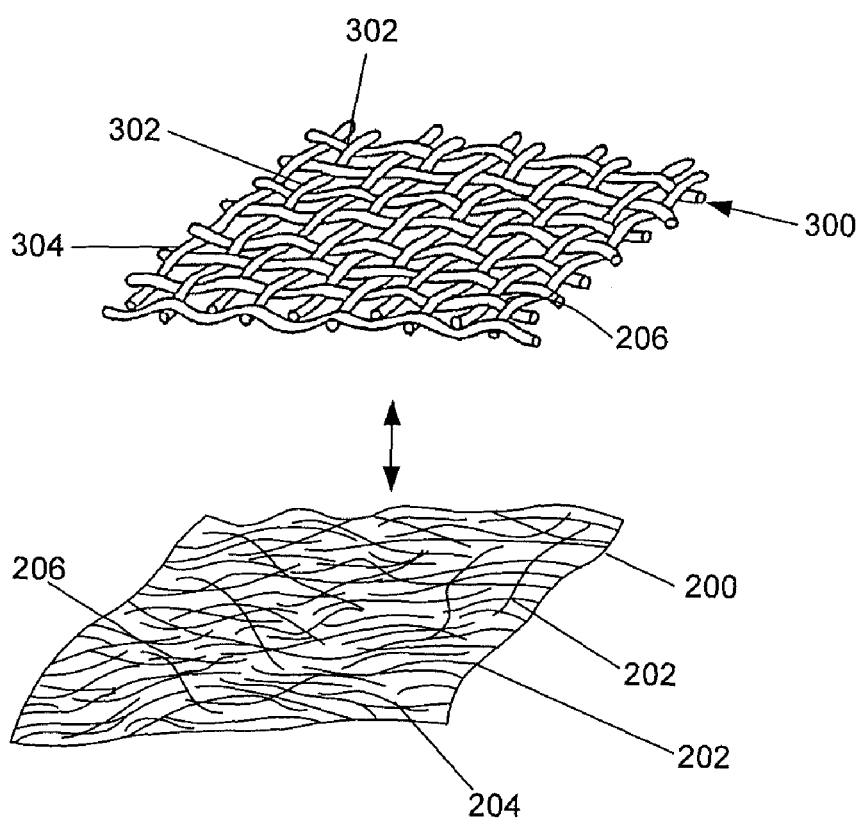
FIG. 3 is a view similar to FIG. 2 and disclosing another embodiment of a reinforcement sheet having a thin porous layer of binder coated glass fibers having a coating material thereon combined with a mesh illustrated in exploded configuration and having some of the coating material thereon.

In FIG. 2 each glass reinforced sheet 108 or 110 is a thin porous layer 200 having glass fibers 202 that are joined together by a cured binder 204 that coats the glass fibers 204. Another embodiment in FIG. 3 includes the thin porous layer 200 reinforced by a mesh 300 on a slurry facing side of the thin porous layer 200. The mesh 300 is a grid of glass fibers 302 providing mesh openings that are larger than the pores of the thin porous layer 200. The slurry penetrates through the mesh 300 to engage the thin porous layer 200. The mesh 300 imbeds in the slurry of a hydraulic cementitious compound.

The mesh 300 is fabricated of glass fibers 302 that are thicker and stronger in tensile strength than thinner glass fibers 202 of the thin porous layer 200. The glass fibers 302 of the mesh 300 are interlaced or are laid without being interlaced to form a grid of the mesh 300. A binder 304 joins the glass fibers 302 of the mesh 300 at their junctions where the fibers 302 engage one another. The mesh 300 is assembled over and onto the thin porous layer of glass fibers. The binder or other suitable adhesive further attaches the mesh 300 onto the thin porous layer 200 of glass fibers 202.

An embodiment of the thin porous layer 200 constitutes glass fibers 202 interlaced by weaving or knitting, and covered by a binder 204. A preferred embodiment of the thin porous layer 200 of glass fibers 202 has non-interlaced glass fibers 202 accumulated in random or selected orientations. The fibers 202 are drawn from molten glass and are chopped to short lengths. The chopped fibers accumulate on a chain belt conveyor and form a thin, water vapor porous layer 202 also known as a mat. A binder 204 constituting a binder resin in a fluid binder composition is dispersed among the fibers 202 for the binder 204 to adhere the fibers 202 together at their engaged junctions. Further the binder 204 coats substantial surfaces of the glass fibers 202. Residual heat of the glass fibers 202 and heat provided by an oven cures the binder 204 and drives off volatiles of the binder composition to provide a thermoset polymer binder 2-4 bonding the fibers 202 together at their engaged junctions. The resulting thin, water vapor porous layer 200 of binder coated glass fibers 202 is vapor porous and is required to be wetted at beginning contact by the slurry for the slurry to adhere to the slurry facing side of the thin porous layer. Further, an embodiment of the thin, water vapor porous layer 200 of binder coated glass fibers 202 is required to be wetted at beginning contact by the slurry for the slurry to penetrate the pores of the thin porous layer 200, to slurry coat the binder coated glass fibers 202 with a thin film of the slurry. Further, an embodiment of the thin, water vapor porous layer 200 of binder coated glass fibers 202 is required to be wetted at beginning contact by additional slurry for the additional slurry to slurry coat the glass fibers 202 with a thin film of the additional slurry and to penetrate the pores of the thin porous layer 200 and merge with the slurry that forms the core 102.

A conventional or traditional binder 204 includes a thermosetting polymer resin. A binder composition includes the binder resin dispersed or dissolved in a fluent carrier to form a water based emulsion or a solvent based solution. The binder composition can include other chemical substances, such as, a fire retardant, a fungicide or biocide, coloring matter, or other substance in a mixture with the binder. The resulting binder composition is in the form of a dry mixture, a dispersible mixture or soluble mixture.

The binder composition can be applied to the fibers 202 before the fibers 202 are interlaced. Alternatively, the binder composition can be applied after the fibers 202 are interlaced or after the fibers 202 are accumulated to form a non-interlaced sheet. After the binder composition is applied, heat is applied to dissipate by evaporation volatiles of the binder composition and to dry the binder by polymerization, curing or simply drying and form a thermosetting polymer that bonds the glass fibers to one another. The binder 204 after polymerization is on the interlaced or non-interlaced junctions of the fibers 202 to provide binder coated fibers 202. According to an embodiment, the binder 204 provides a coating to cover and protect the fibers 202. Alternatively, the fibers 202 are not entirely covered by the binder 204.

U.S. Pat. No. 7,241,487 discloses a formaldehyde free binder resin to replace a UF binder resin, a urea formaldehyde or resin, which is inherently hydrophobic especially due to a high rate of curing, to resist forming an adequate bond with the cementitious slurry. Formaldehyde free resins are being developed in the interest of reducing volatile organic compound emissions, VOC emissions. One such formaldehyde free binder resin is a hydrophobic acrylic acid based polymer, or other polycarboxy polymer, combined with a polyol, such as glycerine or a low molecular weight oxyalkylate of glycerine providing a cross linking element, which upon curing provides a crosslinked thermoset polymeric binder for bonding glass fibers to one another. The acrylic binder resin polymerizes with the polyol, such as glycerine, to form a UF free, thermoset polymer as a binder on glass fibers.

The binder strength refers to the tensile strength of the binder 204. A preferred binder 204 embodiment is either hydrophobic or hydrophilic provided that it retains its binder strength when wetted by the slurry. Embodiments of a hydrophobic binder 204 are provided by a UF binder resin and an acrylic binder resin that polymerizes with a polyol, such as glycerine, to form a UF free, thermoset polymer as a binder on glass fibers 202. An embodiment of a hydrophilic binder 204 on glass fibers 202 is provided by an acrylic binder resin of low level polymerization, which weakens in tensile strength when wetted by the slurry.

A first example of a glass reinforcement sheet 108, 110 is provided by a thin porous layer 200 of chopped glass fibers 9-18 micron diameter range, 10-35 mm. length range. The glass fibers 202 are accumulated to provide a thin porous layer 200 of the glass fibers 202. A first pass dispersal of a thermoset binder resin in an aqueous binder mix is dispersed among the glass fibers 202 in the porous layer 200 to provide binder coated glass fibers 202. The thin porous layer 200 is conveyed through an infrared or convection oven to cure the binder 204 to a thermoset polymer and bind the binder coated glass fibers 202 to one another.

The glass reinforcement sheet 108, 110 is not to be confused with fiber glass insulation wherein elongated and lengthy glass fibers are coated with a binder and air-fluffed to an R-value thickness of air-fluffed glass fibers. The binder is cured to affix the glass fibers in their fluffed orientations. The glass fibers are bound together by the binder to provide a mat of R-value thickness. The R-value thickness is unsuitable for serving as a glass reinforcement sheet because the R-value thickness is thicker than a cementitious board to be reinforced by a glass reinforcement sheet. And fiber glass insulation is easily torn into pieces of desired dimensions, which makes the fiber glass insulation unsuitable in tensile strength to serve as a glass reinforcement sheet.

The glass reinforcement sheet 108, 110 is not to be confused with a duct board having glass fibers in compact orientations to form a rigid panel or board with an R-value thickness. The duct board is assembled onto broad surfaces of a ventilation duct to provide thermal insulation on the duct.

A second pass coating of a coating material 206, FIG. 2, is applied on the binder coated glass fibers 202 on a slurry facing side of the sheet 108, 110. The coating material 206 is applied neat or diluted as a solution or emulsion in water or other fluent carrier and is advantageously dried by latent heat retained by the binder covered glass fibers 202 immediately following the fibers 202 being heated by heated curing of the binder 204.

A second example of a glass reinforcement sheet 108, 110, includes the first example of a thin porous layer 200 of binder coated glass fibers 202. In addition, a mesh 300 of binder coated glass fibers 302 is applied to overlie the binder coated glass fibers 202 in the thin porous layer 200, and is attached by an adhesive. The second pass coating of the coating material 206 is applied on the glass fibers of both the mesh 300 and the thin porous layer 200 on the slurry facing side of the sheet 108, 110.

The coating material 206 is not to be confused with a sizing composition. A sizing composition is applied to individual fibers to provide each individual fiber with individual tensile strength and with surface properties, such as, surface hardness or softness, surface durability, water repellency or absorptiveness. A sizing composition adapts individual fibers for durability and manipulation during weaving or knitting to make a fabric for purposes other than for fabric reinforcement. As stated in U.S. Pat. No. 5,393,335 to Puckett et al. a sizing composition serves to protect the fibers from abrasion arising from contact with each other or with processing machinery.

After the binder is cured, for example, by heating in an oven, the binder coated glass fibers 202 exit from the oven and retain residual heat and are immediately coated with the coating material 206, a thin film of a dry hydrophilic wetting material 206 that coats a previously cured binder 204, is soluble and mobile in water content of the slurry and is volatile at a temperature level and time duration in an oven used to dry a partially hardened slurry. When the mesh 300 is present on the slurry facing side of the thin porous layer 200 of glass fibers 202, the binder coated glass fibers 302 of the mesh 300 are provided with the coating material 206.

The coating material 206 is applied by spraying or by doctor blade preferably on a slurry facing side of the thin porous layer 200 of binder coated glass fibers 202 and on the mesh 300 if present. The coating material 206 can penetrate the thin, water vapor porous layer 200 to coat the opposite side. Most preferably the coating material 206 is applied on both the slurry facing side of the binder coated glass fibers 202 and an opposite side facing away from the slurry facing side. The coating material 206 is dried advantageously by residual heat of the binder coated glass fibers 202 exiting from the binder curing oven.

The coating material 206 is mobile in water to dilute and disperse rapidly at beginning contact with water, particularly surface molecules of water at a surface of a slurry of the cementitious compound to provide immediate and rapid slurry wetting and slurry spreading upon immediate contact of the thin, water vapor porous layer 200 of binder coated glass fibers 202 with the slurry, for the binder coated glass fibers 202 to bond to the cementitious compound of the slurry. Further the coating material 206 provides immediate and rapid slurry wetting and spreading to displace air from the pores and the surfaces of the thin porous layer 200. The displacement of air from the thin porous layer 200 minimizes formation of air bubbles in the wet slurry passing through the thin porous layer 200 to form a thin film with a smooth surface on the binder coated glass fibers 202. Prior to the invention, the thin film of cementitious compound on the binder coated glass fibers 202 had a roughened surface texture due to peaks and valleys formed by air bubbles in the wet coating. The surface texture tended to collect surface moisture, especially when the surface texture provided moisture collecting valleys and water attracting capillaries, which promoted unwanted mold and bacteria growth. According to an embodiment of the invention the immediate and rapid wetting and spreading of the cementitious compound rapidly forms a wet surface on the binder coated fibers 202. The wet surface has time to smooth by slumping due to gravity, while the volatile form of the water soluble, hydrophilic wetting material 206 escapes and impels trapped air bubbles away from the surfaces of the binder covered glass fibers 202 and from the pores in the thin porous layer 200.

Further, the coating material 206 is hydroscopic to water vapor evaporating from the slurry, which wets the soluble, hydrophilic wetting material 206 with the water vapor before being wetted and dissolved or solubilized by the water molecules of the slurry. The hydroscopic property of the soluble, hydrophilic wetting material 206 further provides immediate and rapid slurry wetting and slurry spreading on the binder coated glass fibers 202 of the thin porous layer 200.

The coating material 206 counteracts resistance to wetting and bonding of the slurry due to high surface tension of water in the slurry, and due to a hydrophobic binder 204 and any hydrophobicity of the glass fibers. Further, the coating material 206 counteracts slowing of slurry wetting, slowing of slurry spreading and slowing of drying due to absorption of slurry water by a hydrophilic binder 204.

During manufacture of a cementitious board, heat is applied to hydrate and dry the cementitious compound, and to hasten evaporation of the volatile coating material 206. The pores of the thin porous layer 200 provide passages for evaporation of the volatile coating material 206 through the pores in a direction away from the cementitious compound on the slurry facing side of the thin porous layer 200. The cementitious compound becomes essentially free of the volatile coating material 206. Further, water content of the slurry dissipates by evaporations through the pores of the thin porous layer 200 to impel the volatile coating material 206 in a direction away from the cementitious compound.

The coating material 206 on the binder coated glass fibers 202 is mobile in slurry water to dilute and disperse at beginning contact with surface molecules of slurry water at a surface of the slurry to provide immediate and rapid slurry wetting and slurry spreading upon contact of the reinforcement sheet 108, 110 with the slurry, and to provide an adequate bond between the slurry and the binder on the glass fibers 202 and any remaining glass surfaces not covered by the binder 204. The coating material 206 at beginning contact with surface molecules of water content of the slurry counteracts resistance to bonding of the slurry due to high surface tension of water in the slurry, a hydrophobic binder 204, and any hydrophobicity of the glass fibers 202. The coating material 206 is soluble and mobile in the slurry water content to dilute and disperse rapidly in the surface molecules of slurry water for immediate and rapid wetting and spreading the slurry surface over the binder coated glass fibers 202, and for the slurry facing side of the thin, water vapor porous layer 200 to adhere to the core 102 made by the slurry. For embodiments in which the thin, water vapor porous layer 200 is penetrated through by the penetrating slurry, the mobile coating material 206 in the surface molecules of slurry water penetrates the thin, water vapor porous layer 200 to wet and spread the slurry surface of the penetrating slurry on the thin, water vapor porous layer 200 and for the binder coated glass fibers 202 to adhere to the penetrating slurry. After the slurry and glass reinforcement sheet 108, 110 are assembled together, the slurry of cementitious compound is dried in an oven at temperature level above 80° C., approximately 250° F. for a time duration of about 30 minutes. The coating material 206 is made mobile by dilution and dispersion in slurry water and the diluted and dispersed coating material 206 is rapidly volatilized when subject to a temperature level and time duration in the oven used to dry the slurry. An unexpected result is attained when the coating material 206 dissipates by evaporation to leave the cementitious compound essentially free of the coating material 206 and unchanged in its chemical and physical properties, and the binder 204 is essentially free of the coating material 206 to return its surface to its original hydrophobic properties, to avoid undesired moisture and water absorption in the manufactured cementitious board 100. The last remnants of the coating material 206 become soluble, mobile and volatile and removed by evaporation, such that no residual effects of the coating material 206 remain. The hydrophilic coating material 206 transfers as a solid from the binder coated fibers 202 to slurry water of a cementitious compound for dilution and dispersion in the slurry water and to dissipate to the atmosphere rapidly by being volatile in the slurry water to dissipate by evaporation when subject to a temperature level and time duration in the oven at which the cementitious compound is dried to form a cementitious board 100.

A suitable coating material 206 at ambient temperatures is non-volatile or of extremely slow volatility, and is highly volatile while the slurry is dried in an oven, for example, at a temperature level of approximately 250° F. for a time duration of about 30 minutes. Suitable coating materials 206 are as follows:

Most preferred coating material: *Glycerine
Preferred coating material: Low molecular weight alcohols including:
*ethylene glycol, *propylene glycol, *diethylene glycol,
*a thermally labile substance mobile in water to dilute and disperse, and when heated will chemically decompose to volatile component substances of lower molecular weight.
*volatile substance when heated above 80° C. and rapidly dissipates by evaporation from slurry water eliminating the side effect of residual hydroscopicity in slurry and core of a cementitious board and on binder coated glass fibers. At ambient temperatures and pressures the substance is semi-volatile for having a slow rate of volatility over time. Volatility is slowed, and shelf life is extended by enclosing the glass reinforcement sheet in a sealing wrapper that is removed for the purposes of board manufacture.
hexanol (several isomers), benzyl alcohol
**partially soluble in water and miscible or self-emulsifiable in water . . . therefore mobile in water.

Less preferred coating material: ***Simple sugars (monosaccharides) such as: Ribose, Ribulose, Xylose, Glyceraldehyde, Inorganics: Sodium chloride, Potassium chloride, Calcium chloride, Ammonium chloride (semi volatile unless chloride reacts with calcium in cements to form non-volatile calcium chloride).

***essentially non-volatile at ambient temperatures and pressures but mobile in water. This allows dispersion and dilution for rapid evaporation with slurry water at elevated temperature, and mitigating the side effect of residual hydroscopicity. This class of chemicals does not reduce surface tension, but can nonetheless render the sheet more wettable by increasing the sheet's effective surface free energy. This class of chemicals is volatile to dissipate by evaporation with the slurry water hastened by heated drying of the hardened core of the cementitious board in a drying oven.

Unsuitable coating material: ****surfactants
****essentially non-volatile substances, and even though they are somewhat mobile in water, they have remain in slurry and core of a cementitious board and remain on the binder coated glass fibers, and as a result, cause a negative side effect of permanently increasing wettability and moisture absorption in the finished cementitious board product. Further, surfactants easily wash off with water as discussed in U.S. Pat. No. 7,521,587.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Patents and patent applications referred to herein are hereby incorporated by reference in their entireties. Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method of making a reinforcement sheet for a cementitious board comprising:
applying a hydrophilic coating material on binder coated glass fibers wherein the non-interlaced glass fibers are accumulated in random or selected orientations and are coated with a binder that adheres the glass fibers together by curing prior to applying the hydrophilic coating material on the binder coated glass fibers, the hydrophilic coating material being mobile in slurry water to dilute and disperse upon contact by surface molecules of the slurry water at a surface of a slurry of a cementitious compound to dilute and disperse, and to wet and spread the slurry on the binder coated glass fibers, and the hydrophilic coating material being volatile to dissipate by evaporation at an elevated temperature at which the cementitious compound is dried for the binder coated glass fibers to be essentially free of the hydrophilic coating material as a source of water and moisture absorption to provide a water vapor porous layer with a hydrophobic surface.

2. The method of claim 1, comprising:
attaching the water vapor porous layer of the binder coated glass fibers to a mesh of glass fibers for imbedding in the slurry.

3. The method of claim 1, wherein the hydrophilic coating material is nonvolatile at atmospheric temperatures and pressures.

4. The method of claim 1, wherein the water vapor porous layer is porous to a volatile form of the hydrophilic coating material.

5. The method of claim 1, wherein the water vapor porous layer has pores for passage of the slurry.

6. The method of claim 1, wherein the water vapor porous layer has pores preventing passage of the slurry.

7. The method of claim 1, wherein the glass fibers of the water vapor porous layer are wet-laid.

* * * * *